No. 734,713. Patented July 28, 1903.

UNITED STATES PATENT OFFICE.

GEORGE FRANÇOIS JAUBERT, OF PARIS, FRANCE.

PROCESS OF MAKING HYDRATES OF ALKALINE-EARTH DIOXIDS.

SPECIFICATION forming part of Letters Patent No. 734,713, dated July 28, 1903.

Application filed August 31, 1901. Serial No. 73,969. (No specimens.)

*To all whom it may concern:*

Be it known that I, GEORGE FRANÇOIS JAUBERT, a citizen of Switzerland, residing at Paris, France, have invented a new and useful Improvement in the Process of Making Hydrates of Alkaline-Earth Dioxids, which improvement is fully set forth in the following specification.

This invention has for its object a novel process for the preparation of the alkaline-earth dioxids in the manner herein described.

Barium sulfid, as is well known, is one of the soluble salts of barium, which is a cheap commercial article. I have found that a solution of this crude commercial sulfid, which contains besides the sulfhydrate also polysulfids, &c., (and which may be obtained by extracting the product of the reaction at a high temperature of carbon upon heavy spar with boiling water,) is not oxidized, as would have been expected, by the addition of a solution of a hydrate of sodium dioxid, but causes, on the contrary, double decomposition, there being formed, on the one hand, crystallized hydrated barium dioxid, with an output which sometimes exceeds ninety per cent., and, on the other hand, sodium sulfid. The dioxid obtained is remarkably pure, its standard being about ninety-five per cent.

The process is worked as follows: I commence by preparing the two solutions of barium sulfid and the hydrated sodium dioxid. The solution of barium sulfid is obtained by finely pulverizing one hundred and ten kilograms of crude commercial barium sulfid, which are extracted by leaching three times in succession with three hundred and fifty liters of boiling water. The extracts are mixed together and make about one thousand liters. The standard is next taken after having allowed the temperature to fall from 25° to 30° centigrade in such a way that all remains in solution. The standard found is about eighty-four to eighty-five kilograms, calculated in monosulfid. The second solution of hydrated sodium dioxid is obtained by dissolving either one hundred and twenty to one hundred and thirty kilograms of hydrated sodium dioxid or forty-two to forty-five kilograms sodium dioxid of commerce in one thousand liters of cold water. The standard is taken with permanganate. This standard varies according to the precautions taken in the dissolving when the anhydrous dioxid is used. If it has been suitably cooled, there should be about thirty-nine kilograms of dioxid, calculated anhydrous and at one hundred per cent. When once these solutions are prepared, the solution of hydrated sodium dioxid is poured, while stirring, into the barium sulfid. An abundant formation of scales, which are hydrated dioxid of barium, is immediately seen. After stirring for some minutes the liquid is filtered off and the product pressed and washed in pure uncarbonated water. By this means a cake of hydrated barium dioxid of one hundred and sixty to one hundred and eighty kilograms weight is obtained, according to the degree of dryness. Analogous results are obtained if other more or less soluble sulfids are employed, such as strontium sulfid, for example, or calcium sulfid, which is very little soluble.

Having now particularly described and ascertained the nature of my said invention and in what manner the same is to be performed, I declare that what I claim is—

The process of making the hydrates of the alkaline-earth dioxids by causing a solution of an alkaline-earth sulfid to react by double decomposition upon a solution of a hydrate of an alkaline dioxid, as set forth.

In testimony whereof I have signed this specification in the presence of two subscribing witnesses.

GEORGE FRANÇOIS JAUBERT.

Witnesses:
   PAUL DE MESTRAL,
   EDWARD P. MACLEAN.